(No Model.)  2 Sheets—Sheet 1.
M. THOMPSON & J. KUCHER.
ANIMAL POWER.
No. 314,492. Patented Mar. 24, 1885.
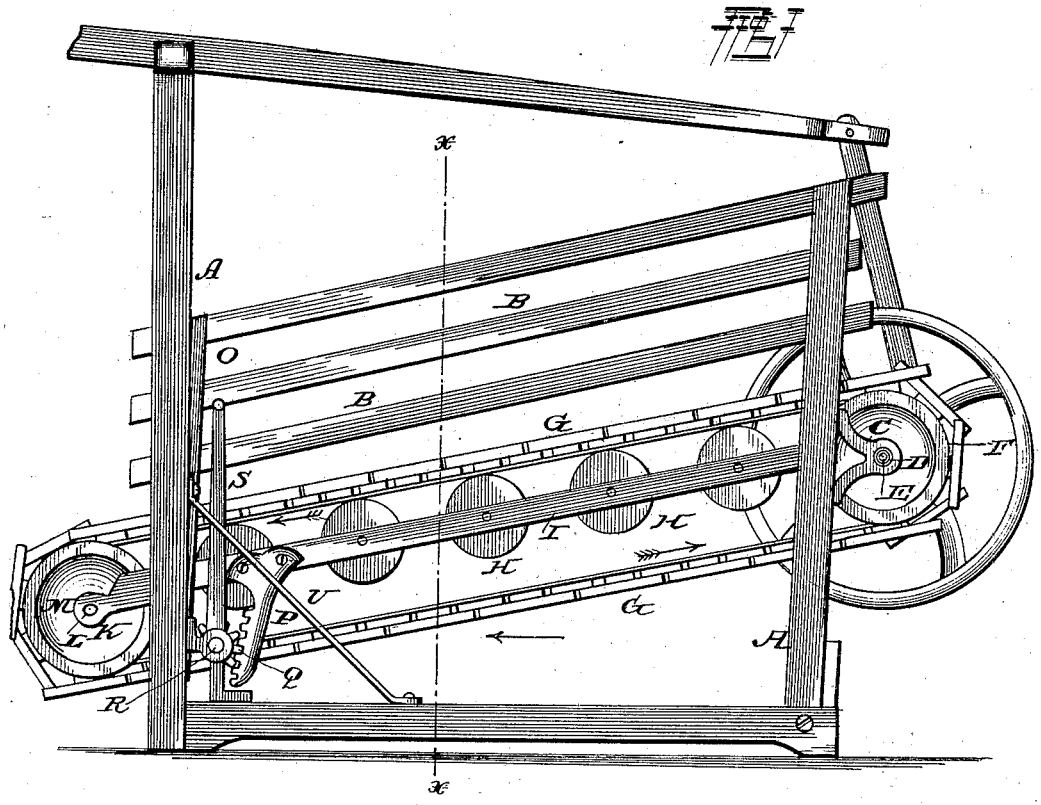
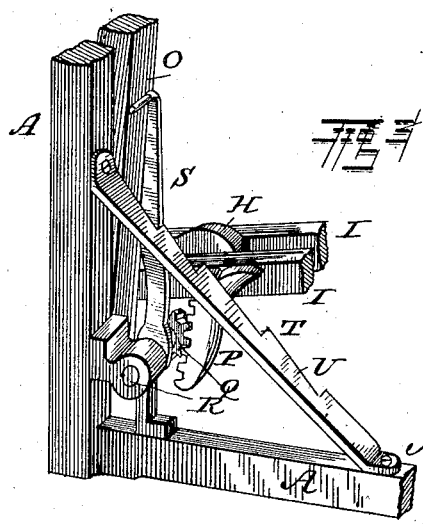
WITNESSES:
Fred. G. Dieterich.
Arthur L. Morsell.
Mark Thompson
John Kucher
INVENTORS
By Louis Bagger & Co.
ATTORNEYS.

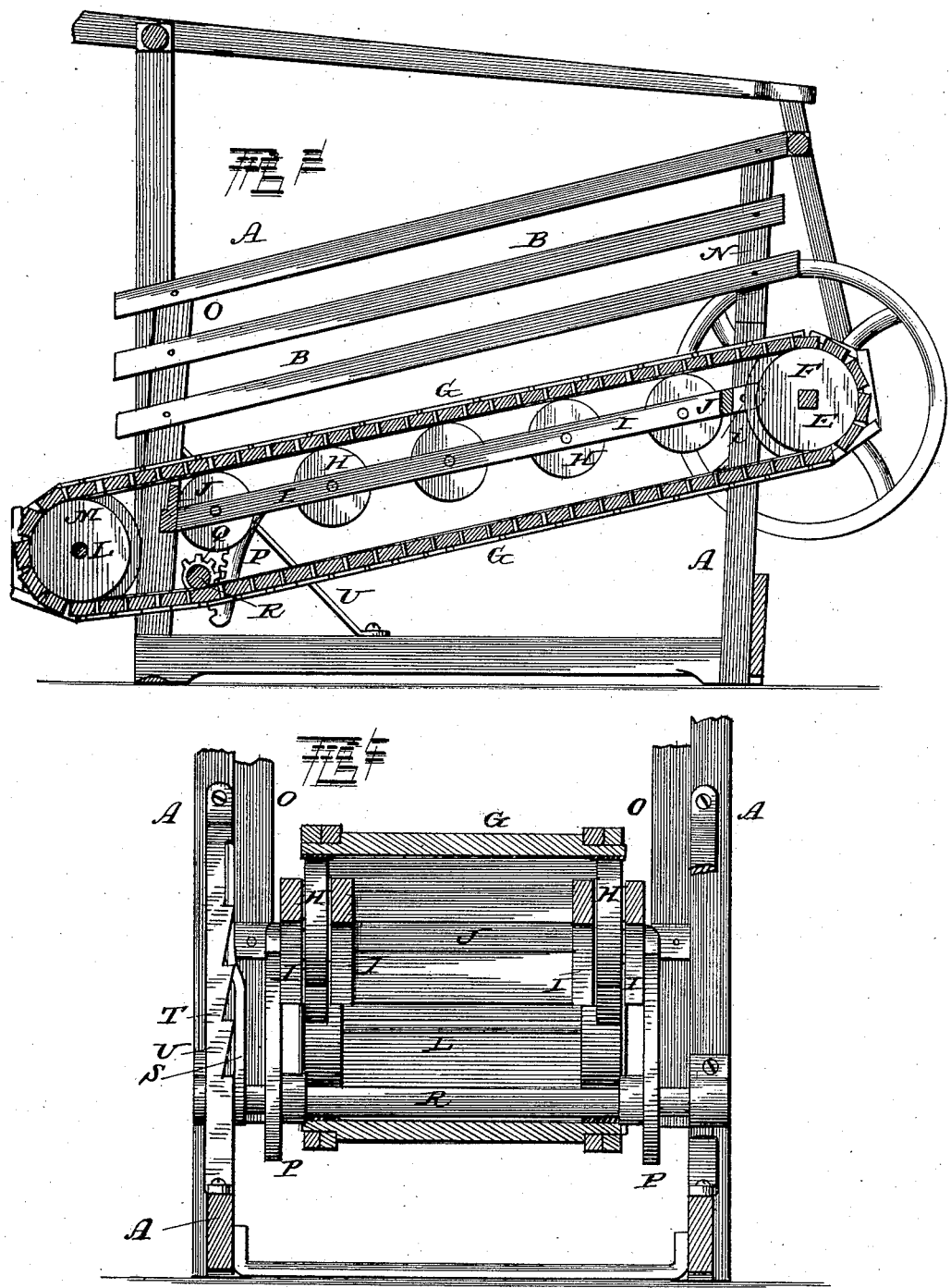

United States Patent Office.

MARK THOMPSON AND JOHN KUCHER, OF ATHENS, PENNSYLVANIA.

ANIMAL-POWER.

SPECIFICATION forming part of Letters Patent No. 314,492, dated March 24, 1885.

Application filed April 25, 1884. Renewed February 7, 1885. (No model.)

*To all whom it may concern:*

Be it known that we, MARK THOMPSON and JOHN KUCHER, citizens of the United States, and residents of Athens, in the county of Bradford and State of Pennsylvania, have invented certain new and useful Improvements in Animal-Powers; and we do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of our improved animal-power. Fig. 2 is a longitudinal vertical section of the same. Fig. 3 is a perspective detail view of the rack for adjusting the working pitch or angle of the machine and the lever for operating the rack; and Fig. 4 is a vertical cross-section through line $x\,x$ in Fig. 1.

Similar letters of reference indicate corresponding parts in all the figures.

Our invention has relation to animal-powers, and is more especially adapted for dog-powers.

It consists in the improvements, which will be hereinafter more fully described and claimed, and whereby we provide means for adjusting the pitch of the endless platform or apron, while at the same time we greatly strengthen the component parts of the machine as a whole.

In the accompanying drawings, A denotes the frame, which has the usual inclined guards or rails, B, for confining the dog or other animal which operates the power to its proper place.

Fastened to the front end of the frame are projecting iron brackets C, the outer ends of which form journal-boxes D, for the front shaft, E, upon which the wheels F, which support the elevated front end of the traveling apron, are fastened. From this it will be seen that the bearings of shaft E, which sustains the elevated front end of the traveling platform or apron, are located outside of and in front of the frame.

G denotes the inclined traveling platform, which may be of any desired construction, and which travels upon rollers H, journaled in inclined ways I. The ways I on opposite sides of the machine are connected by cross-bars J, and are hinged at $i$ in the front part of the frame back of the shaft E. The rear end of the frame formed by the sides I and cross-bars J is provided with rearwardly-extending boxes or bearings K, for the shaft L, upon which the wheels or rollers M are fastened, which support the rear end of the traveling apron, so that it will be seen that the rear end of the platform projects to the rear of the frame. The rails B are fastened at their front ends in blocks N, which are attached to the inner sides of the uprights forming the front of frame A, and the rear ends of the said rails are similarly fastened in standards O, the lower ends of which are fastened to the inclined movable ways I and their rear cross-bars or braces, J, and it follows that when these ways and the platform are moved either up or down the rails or side guides, B, will move with them, thus always maintaining their proper position relative to the traveling platform.

Fastened upon the rear ends of the ways I are downward-projecting racks P, adapted to engage a pinion, Q, of which there is one fastened at each end of a shaft, R, which is provided at one of its ends with a lever, S, for operating it. This lever is adapted to engage any one of a series of notches, T, in a brace-bar, U, in the rear end of the frame, there being one of these brace-bars on each side of the machine.

From the foregoing description, taken in connection with the drawings, the manner of operating or adjusting our machine will readily be understood.

It will be seen that the angle or pitch of the traveling platform, with its ways and rails, may be raised or lowered by turning the lever S, which causes the pinions Q upon shaft R to engage the racks P, which are fastened to the ways I.

By means of the notched brace-bar U the lever may be held in its adjusted position after the platform has been placed at the proper pitch for working the power to the greatest advantage.

Having thus described our invention, we claim and desire to secure by Letters Patent of the United States—

The combination, in an animal-power, of the stationary frame, the ways I, carrying the endless traveling platform, and hinged in the forward part of the frame, the ways or guides B, attached to the parts N and O, which (said parts) are attached to the upper part of the frame, the downward-projecting racks P, fastened to the rear ends of the platform-supporting ways, shaft R, having pinions Q, adapted to engage said racks on opposite sides of the frame, lever S, and notched brace-bar U, the whole constructed and combined to operate substantially in the manner and for the purpose herein shown and specified.

In testimony that we claim the foregoing as our own we have hereunto affixed our signatures in presence of two witnesses.

MARK THOMPSON.
        JOHN KUCHER.

Witnesses:
  C. H. ARNOLD,
  JOSEPH HINES.